July 16, 1968

J. BEMROSE 3,393,402

METHOD OF FILTERING SEISMIC SIGNALS

Filed May 14, 1965

INVENTOR
JOHN BEMROSE

BY *McLean, Morton, & Boustead*

ATTORNEYS.

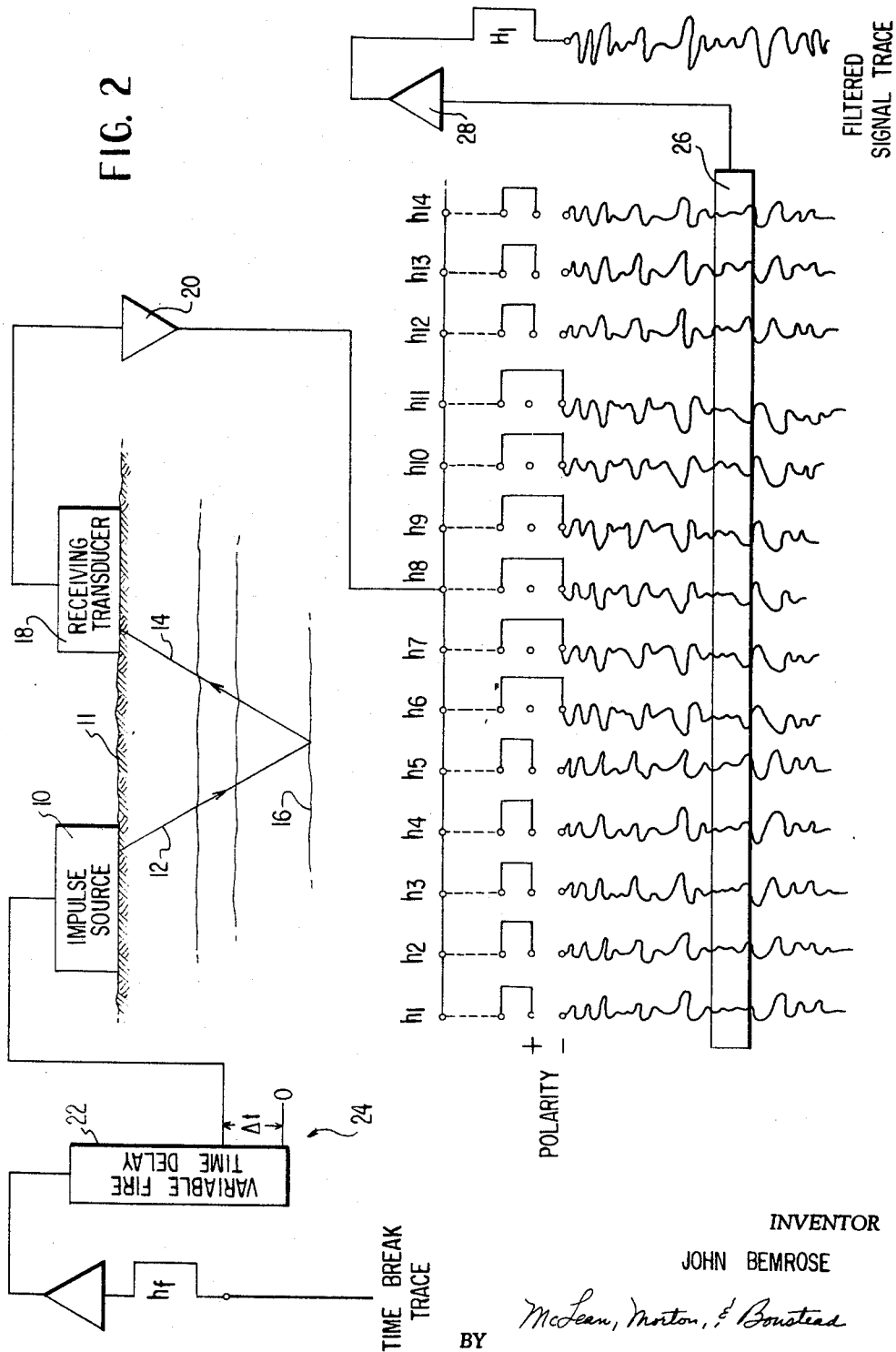

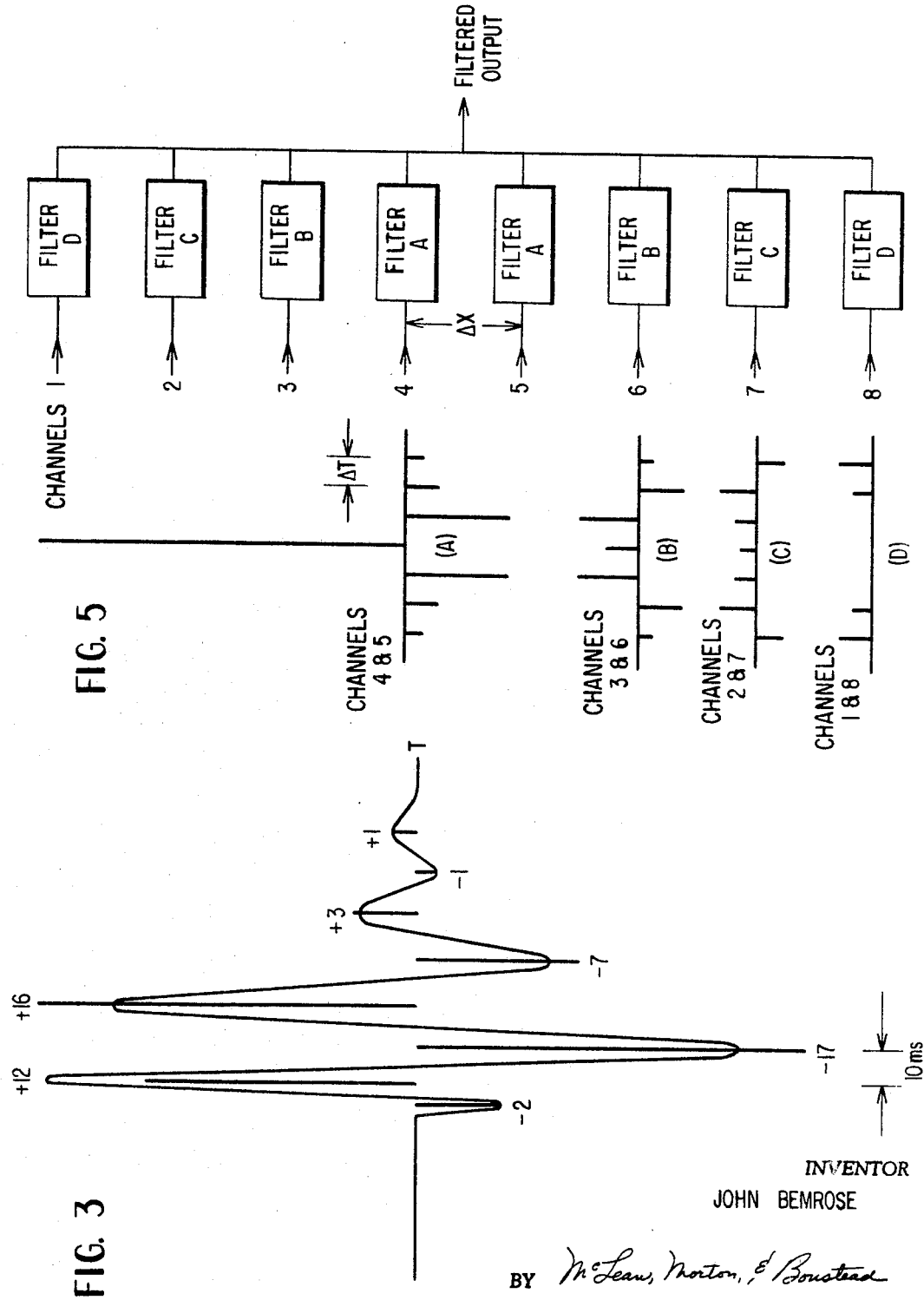

July 16, 1968  J. BEMROSE  3,393,402
METHOD OF FILTERING SEISMIC SIGNALS
Filed May 14, 1965  5 Sheets-Sheet 5

INVENTOR
JOHN BEMROSE

BY *McLean, Morton, & Boustead*

ATTORNEYS.

3,393,402
METHOD OF FILTERING SEISMIC SIGNALS
John Bemrose, Tulsa, Okla., assignor, by mesne assignments, to Sinclair Research, Inc., New York, N.Y., a corporation of Delaware
Filed May 14, 1965, Ser. No. 455,698
6 Claims. (Cl. 340—15.5)

This invention relates to seismic geophysical surveying and is directed particularly to the recording of received seismic signals with an improved discrimination against noise or unwanted signals or, in other words, with an improved seismic signal-to-noise ratio.

As it is well known in the art of seismic prospecting, a seismic disturbance created at or near the surface of the earth generates various types of seismic waves, i.e., various components of the initial seismic wave, which follow different paths before reaching spaced detecting stations. Since the purpose of the reflection method is to determine the depth of geological reflectors and discover their structural features, only reflection paths are of interest and convey the desired information. The other paths create a perturbing effect which is commonly designated interference or "noise." Examples of the undesired paths are surface, refraction, diffraction, and scatter.

The term "noise" as used in this specification, includes not only noise of a generally random character, but also seismic signals which occur so close together in time that they are difficult to separate or resolve, or seismic signals reaching the detectors by unknown paths or from unwanted directions. However, the reflections reach spaced detectors substantially simultaneously; whereas, the interference or noise reaches the detectors at varying times. In other words, while the interferences and noises have substantial or random phase differences between spaced detector locations, the reflected waves are substantially in phase at all the receiving points.

There are many popular procedures for minimizing the effect of interference and "noise" on seismic recordings. One of the most commonly used procedures is based on the amplitude, the frequency, and the time-phase relation of multiple signals. Normally, a part of this discrimination is performed by filters in the recording system, or by the combination of such filters with the frequency-response characteristics of other elements of the system such as the seismometer and the galvanometer. Still additional discrimination has been provided by the additive or other compounding of multiple-signal inputs. While the compounding of inputs and the visual analysis of the records are generally recognized as excellent ways of discriminating against unwanted noise, the filtering processes commonly employed require complicated circuits and apparatus which cannot be conveniently used in the field. Furthermore, the filtering process is inherently limited by the character of the equipment used.

A primary object of the invention is to provide a method and apparatus for improving the recording and analysis of seismic waves. Other and more specific objects may be briefly stated as, to provide a method and apparatus for further assisting the visual interpretation of seismic records by making more evident the occurrence of in-phase energy; taking full advantage of noise cancellation by additive compounding before further improving on the compounding to get a better signal-to-noise ratio; discriminating against noise and in favor of desired seismic waves on the basis of their arbitrary character rather than their frequency content or range of frequencies; improving the discrimination against noise by a greater sensitivity to the relative phase of signals and noise occuring in different traces; emphasizing the occurrence of waves on different traces which correlate with each other or with a pattern or noise-free wave form; combining a given number of input signals to produce noise cancellation or reduction and to form a single summary trace representing the plurality of inputs or traces; exploiting the use of seismic energy sources in a new way by compositing methods which enable filtering of the signals to be carried out during the survey; carrying out linear filtering operations of the recorded signals; carying out inverse filtering operations of the recorded signals; and carrying out two-dimensional filtering of the recorded signals especially where it is desired to reject signals having one apparent velocity and retain those having another apparent velocity even though the frequencies of the signals overlap.

In general, this invention comprises a seismic system designed for subsurface exploration utilizing an impulsive energy source of constant energy level coupled to the ground so that the compressional wave energy level is repeatable in essentially equal amounts, and where the moment of injection of energy with respect to a fixed time origin may be delayed at will by any desired amount. The method of this invention comprises filtering in the time domain and in accordance with this invention such filtering is preformed by the addition of different signals separately originating from the source and recorded on magnetic tape by the aid of a suitable ground-coupled transducer and amplifier system after the signals have undergone refraction and reflection by beds in the subsurface in such a way that any desired numbers of equal and similar signal recordings comprising a set can be added with the same or opposite polarity to another number of equal and similar signal recordings where the individual sets of signal recordings are delayed with respect to a fixed time origin by any desired amount. This method can be extended to any desired number of recording channels operating simultaneously from the same energy source so that the filtering operation is the same for each channel. Also, the number of sets recorded and their relative time delays can be different for each of the several channels in the multi-channel operation so that the recorded signals in each channel are filtered differently and in accordance with some definite specific programs. Furthermore, these differently filtered channels may be added in the same or opposite polarity in any desired number and arrangement, such summation providing an additional dimension to the method of filtering so that, in addition to time domain filtering, distance domain filtering, otherwise known as the pie slice process described in Geophysics, vol. 28 (December 1963) at page 948, can be included in the method in order that the time distance characteristics of wanted and unwanted signals can be used in order to pass the wanted signals and exclude the unwanted signals. The results of this method can also be achieved in less operating time and therefore more advantageously by the use of more than one source of compressional wave energy, said source being matched so as to produce essentially equal levels of energy and fired simultaneously or sequentially pre-arranged numbers and at per-arranged intervals of time by suitable fire time delays for each of the several energy sources. The filtering of seismic signals in accordance with this invention can be performed during the seismic survey in the field as part of the normal technique of signal compositing peculiar to seismic surveying with low energy sources coupled to the ground surface.

Copending Kilmer applications Ser. No. 187,111, filed Apr. 12, 1962, and Ser. No. 314,230, filed Oct. 7, 1963 now U.S. Patents 3,235,027 and 3,314,499, respectively, describe sources of seismic waves which are of particular use in the system of this invention. The devices described in said copending applications impart a compressive impulse to initiate a seismic wave. This impulse is of considerable compressive strength and the devices can be repeatedly used following a regular cycle of pulsed or sequential firing at equal or variable time intervals.

The present invention will be better understood by reference to the accompanying drawings forming a part of this application and illustrating certain embodiments of the invention wherein:

FIGURE 2 is a diagrammatic illustration of a recording system for use in the present invention;

FIGURE 3 is an enlargement of the impulse of a 20–45 c.p.s. pass band electrical filter;

FIGURE 5 is a schematic illustration of a scheme for two dimensional filtering using the method of the present invention;

Figure 1:
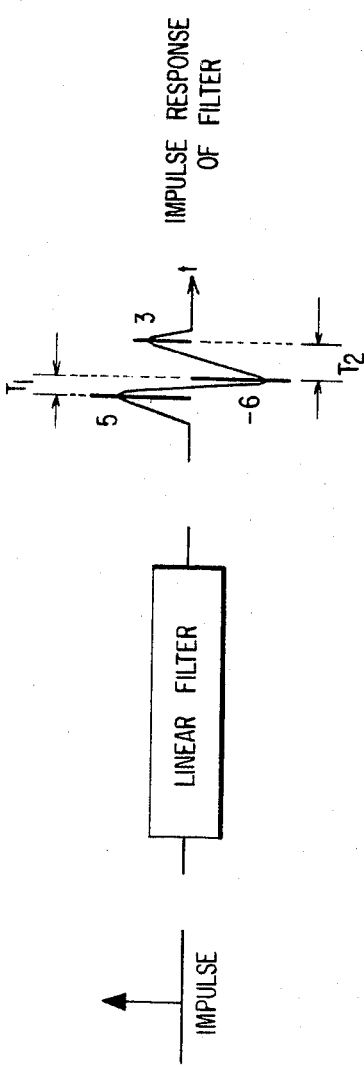
FIGURE 1 is an illustration of the impulse response of an electrical filter.

Referring now to the drawings, in general, for time domain filtering, a recorded seismic signal is multiplied throughout its length by a weighting factor or operator of weight $w_1$ and the resultant is added to the product of the seismic signal and another operator of weight $w_2$ with a time displacement equal to the time interval selected between the operators. To this sum is then added a third product of the signal and operator of weight $w_3$ at the appropriate time spacing, and so on as desired. The resultant is the filtered version of the original signal. The operators may be positive or negative and may be spaced equally or unequally in time. Now it is well-known that an impulse of voltage whose time duration is extremely short when passed through a conventional electrical filter has an output which is a wave train of several cycles' duration, such as illustrated in FIGURE 1. The output is the impulse response of the filter and its shape and time characteristics depend essentially on the characteristics of the filter—different filters yielding different responses to the impulse. Every signal which is a voltage variation with time is really a succession of impulses, the impulses being infinitely close together. To filter the signal in the time domain all the impulse responses of the filter are added together algebraically; thus the filtered version of a signal at time $t$ is the weighted sum of all its past values in time up to $t$.

In accordance with one embodiment of the present invention, the weighting agents used for the time domain filtering are determined by finding the area under each half cycle of the impulse response curve for a desired electrical filter, e.g. the filter of FIGURE 1. The relative areas of this curve are, for example, in the proportion 5:6:3 at the respective peak or trough of the wave train with time separations $\tau_1$ and $\tau_2$, respectively, between the first and second and the second and third. Thus, the impulse response can be approximated by weighting factors 5, 6, and 3 with time separations $\tau_1$ and $\tau_2$, and can, if desired, be more closely represented by other weighting factors at closer and more frequent time separations. With a knowledge of the weighting factors and their time separations for a particular filter, time domain filtering, in accordance with this invention is performed as follows and can, when desired, be performed in the field without elaborate equipment.

FIGURE 2 represents a single channel recording system where energy, represented by line 12, is injected into the ground by an impulse source 10 located on the surface 11 and is received after reflection, represented by line 14, by each of the many reflecting horizons, e.g. 16, by a receiving transducer 18, after which it is amplified. The output of amplifier 20 is recorded on magnetic tape, represented by magnetic heads $h_1$, $h_2$, etc. To simulate the filter of FIGURE 1, for example, source 10 is first used to impart five separate, equal, and otherwise similar impulses, i.e. of the same energy level, into the ground sequentially. Recordings are made of the separate impulses using the recording heads $h_1$ through $h_5$ in turn with positive polarity. By using a variable fire time delay 22 in the firing circuit for source 10, schematically illustrated at 24, so that the moment of injecting the energy into the ground by the impulsive source 10 can be delayed by a time $\Delta t$ from a fixed time origin or time break O (see FIGURE 2), six more separate, equal and otherwise similar recordings are now made sequentially, all of them being delayed in time by the amount $\tau_1$ (see FIGURE 1) utilizing heads $h_6$ through $h_{11}$ in turn with opposite polarity to the previous five recordings. Finally, three additional separate, equal, and otherwise similar recordings are made sequentially and all delayed by an amount $\tau_2$ (see FIGURE 1) over the previous set by another and separate setting of the variable fire time delay 22, these last three recordings being recorded in turn with positive polarity by heads $h_{12}$ through $h_{14}$. The channels $h_1$ through $h_{14}$ are now summed with a wide summing head 26 and the summed output amplified. The output of amplifier 28 which is then re-recorded by the head $H_1$ is the filtered signal desired and is filtered by an approximation of the impulse response of the filter shown in FIGURE 1. Using different numbers of trace recordings as weighting factors spaced in time by the time delay system the impulse response to any filter can be approximated in a like manner.

Figure 4:
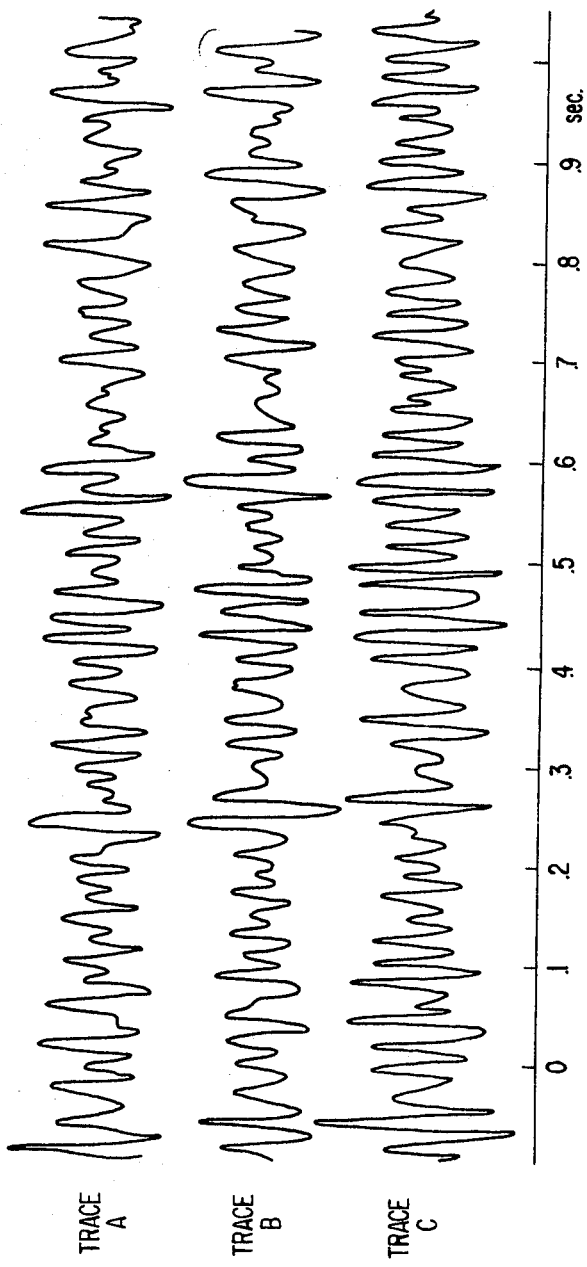
FIGURE 4 is a comparison of filtering by electrical means and the method of the present invention.

As a practical example of filtering in the time domain by means of time spaced weighted factors, FIGURE 3 is an enlargement of the impulse response for an electrical filter for the 20–45 c.p.s. pass band with weighted factors displayed proportional to the area under each half cycle of the curve. A seismogram electrically filtered with the filter of FIGURE 3 is shown in Trace B of FIGURE 4. FIGURE 4 shows for comparison in Trace A a broad-band recording, 10 to 120 c.p.s., of the seismogram and in Trace C, a recording of the same seismogram after filtering with the time domain filter by the time spaced weighted factors of FIGURE 3. Even though the method of this invention is approximate, the similarity between traces B and C is most evident.

The method of this invention is not intended to replace electrical filtering but the method permits unusual filters to be used, filters which are not easily realizable in the frequency domain. Inverse filtering is one where it is possible to restore to the signal those frequencies which are, at least in part, lost by the filtering effect of the subsurface layers through which the energy has passed. Two-dimensional filtering is another one where it is possible to filter individual channels each in a different way in the time domain so that the sum of the channels causes enhancement of signals having a particularly desired apparent velocity with respect to the geophone array and attenuation of signals having an undesired apparent velocity. In the last despect it is desirable that the magnetic recording heads $h$ for each of the several channels comprise a multi-channel array movable in the recording direction so that static or fixed time corrections can be applied prior to shooting for the purposes of filtering so that differential time effects due to relative elevation, etc. of the channel recording transducers can be accommodated or when desired apparent velocities can be preset.

Referring now to FIGURE 5, which illustrates a scheme for two-dimensional filtering over eight channels, with four filters A, B, C, and D, to produce eight seismic traces FIGS. 5(A), 5(B), 5(C), and 5(D), illustrate, respectively, the relative size and polarity of the operator weights for filters A, B, C, and D at time intervals of $\Delta t$, the actual weights being shown in Table I for the eight channels of recording. The number of operator weights can be chosen as desired to give as close an approximation as needed. Eight geophone groups (not shown) linearly spaced at a constant interval ΔX on the ground are used for the eight separate channels of recording. Channels 1 and 8 are filtered in the time domain with filter D; channels 2 and 7 with filter C; channels 3 and 6 with filter B; and the two center channels, 4 and 5, with filter A.

TABLE I

| Time Delay | Channels | | | |
|---|---|---|---|---|
| | 1 and 8, Filter D | 2 and 7, Filter C | 3 and 6, Filter B | 4 and 5, Filter A |
| 0 | 2 | −2 | −1 | −1 |
| ΔT | 1 | 2 | −3 | −2 |
| 2ΔT | 0 | 1 | 4 | −7 |
| 3ΔT | 0 | 1 | 2 | 22 |
| 4ΔT | 0 | 1 | 4 | −7 |
| 5ΔT | 1 | 2 | −3 | −2 |
| 6ΔT | 2 | −2 | −1 | −1 |

ΔT is the delay in the firing time for each set of signals separately produced by a source such as source 10 (FIGURE 2), and negative values of the operator are indicated by recording of the particular channel with reversed polarity. The sum of these eight equi-spaced channels filtered in this way in the time domain is a time-space filtered version of the original signals such that reflection events having zero or near zero step-out over the successive channels are passed with virtually no distortion, while events having a greater step-out time are attenuated. Specifically, reflection events having an apparent velocity over the eight channels greater than ΔX/ΔT are passed with little distortion while those having an apparent velocity less than ΔX/ΔT are attenuated. Since the energy level of individual pulses imparted by the source used with this invention, e.g. see the Kilmer applications referred to above, in its ground-coupled position is essentially equal, the number of impacts are used as a measure of operator weight. Further, since the moment of firing the gas mixture is controlled by a variable fire time delay, the fire time delay is constant for all impulses and, with the exploder ground-coupled at all times, the moment of wave generation in the ground is therefore always delayed in time by the same amount. By using calibrated time delays in the firing circuit additional delay can be incorporated into the system so that by microchannel recordings of separate individual pulses of the exploder it is possible to record a set of signals having a time delay ΔT followed by a separate set of signals having another time delay 2ΔT and so on. The number of microchannel recordings in a set all having the same delay is the operator weight. If the recordings are made with reversed polarity, then the operator weight is negative. A program of recording the operator weights plus or minus spaced in time by means of delays in the firing circuit for each geophone channel can therefore be carried out as part of the normal means of signal compositing in the field.

Figure 6:
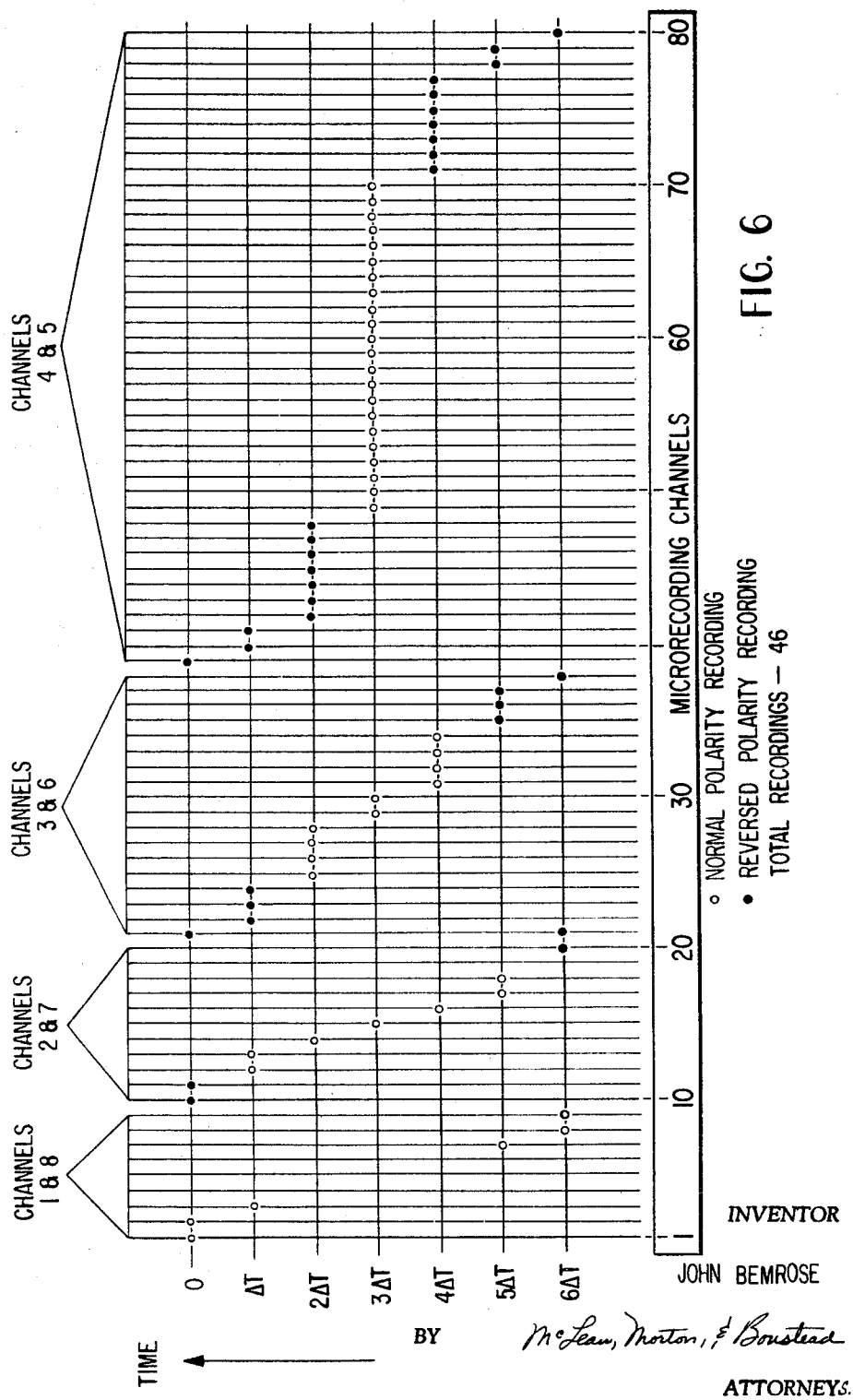
FIGURE 6 illustrates the weighted compositing of individual recordings used for the scheme of FIGURE 5.

FIGURE 6 illustrates a program for eight channels in accordance with the operator weights and time delays shown in FIGURE 4 and Table I. In this scheme 80 microchannels are used and are to be summed with a wide magnetic summing head, not shown (or sequentially with smaller summing heads), at the end of the operation to produce a single seismogram trace. Thus, eight individual geophone groups produce a single space-time filtered trace. The operation may be traced in this scheme as follows: at zero time delay or fundamental time delay of the system the recording of one impulse is made simultaneously for channels 1 and 8 and simultaneously, but in opposite phase for channels 2 and 7, 3 and 6, 4 and 5. Again at zero time delay a second impulse is recorded simultaneously at the next adjacent microchannel for channels 1 and 8 and in opposite phase for channels 2 and 7. A known fixed time delay ΔT is now introduced into the firing circuit for the source and a single impulse is recorded simultaneously in the next microchannel for channels 1 and 8 and channels 2 and 7 and in reversed polarity for channels 3 and 6 and channels 4 and 5 and so on for the remainder of the program, so that, for each time delay, each channel has the requisite number of recordings in each of its microchannels for the operator weight desired. Summation of these recordings by a wide head produces the desired weighted sum of the individual recordings with the desired time delays between each set. The result is a single trace filtered so as to pass events with minimum distortion having an apparent velocity ΔX/ΔT or higher and attenuating events having an apparent velocity less than ΔX/ΔT, ΔX being the channel geophone group spacing interval.

Figure 7:
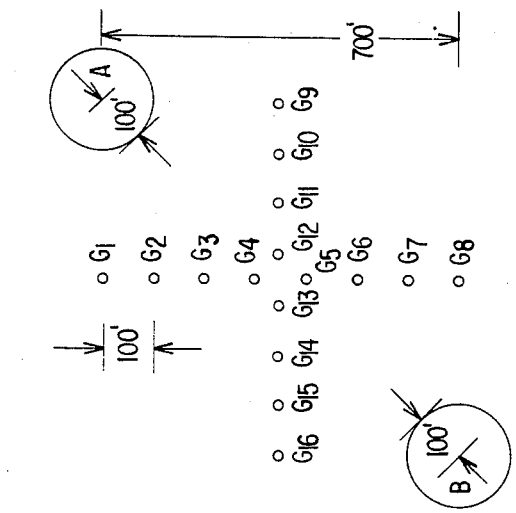
FIGURE 7 illustrates a geophone array useful with the present invention.

FIGURE 7 illustrates two linear geophone arrays at right angles, each composed of eight equi-spaced geophone groups, the compositing scheme for time-space filtering for channels 1 to 8 and 9 to 16 being identical. With a group interval ΔX of 100′ and circular impulse Patterns A and B of a radius of 100′ located at the corners of the figure, the time dip of reflected energy is not more than 0.0012 second per channel for 0.5 second reflection time and a velocity of 8000′ per second or 0.0004 second for one second reflection time and a velocity of 10,000′ per second. Thus the apparent velocities of reflection events are extremely high. The effect of dip in the reflection may be minimized by recording about one-half of the required number of impulses in each of the two patterns A and B. The sum of the weighted recordings of channels 1 to 8 is the desired space-time filtered trace. A similar trace is obtained for channels 9 to 16. These two summed recordings can be added for further enhancement of the results to obtain a single channel of recording. If the results obtained for one linear array are adequate, then of course, the second array at right angles need not be set up.

Figure 8:
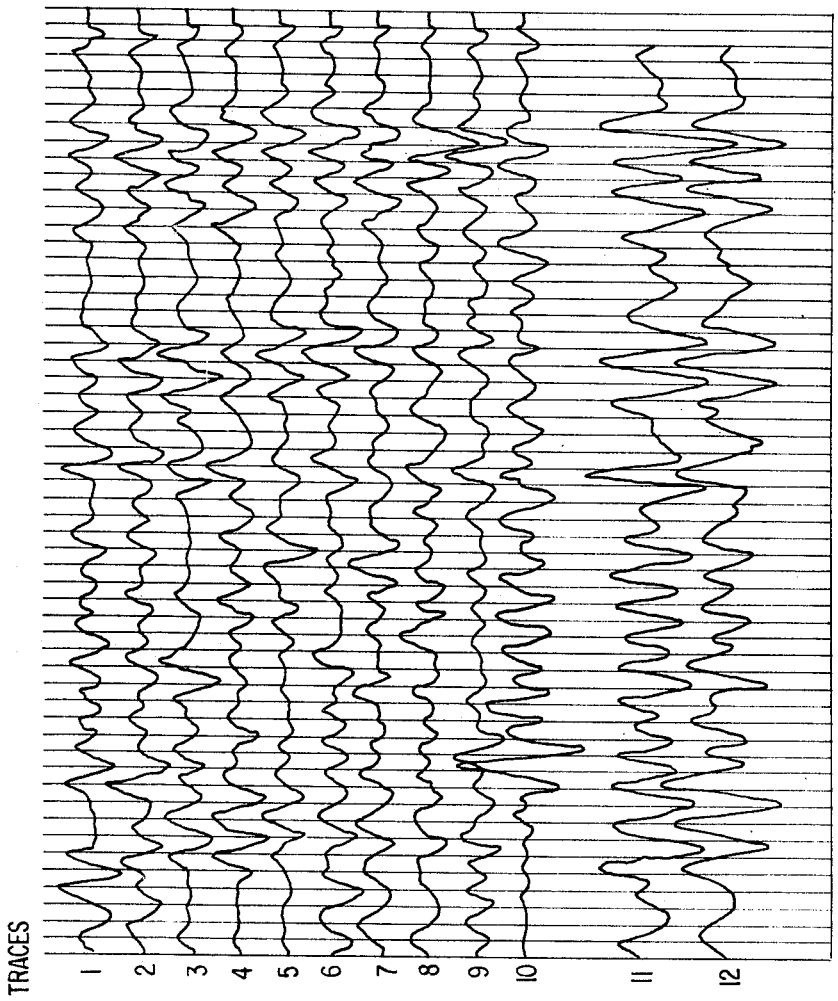
FIGURE 8 illustrates the results obtained with two-dimensional, i.e. space-time filtering in accordance with the present invention.

FIGURE 8 shows the results of space-time filtering using the operator weights enumerated in Table I, using the shot seismogram Traces 1 to 8 and 3 to 10, the results being shown in the lower half of the figure by Traces 11 and 12, respectively. The improvement in the signal-to-noise ratio is most marked. The filtering was performed with an apparent pass velocity corresponding to ±2 ms. per trace.

It is claimed:
1. A method of filtering seismic signals in the time domain utilizing a seismic system designed for subsurface exploration including an impulsive energy source coupled to the ground for injecting compressional wave energy into the ground in repeatable, essentially equal amounts having means for delaying at will the moment of injection of said energy with respect to a fixed time origin by a desired amount, a ground-coupled receiving system for receiving the seismic waves produced by said source after the waves have undergone reflection by beds in the subsurface, and means for recording signals representative of said seismic waves, comprising:
 (a) separately injecting into the ground from said source a first set of a first predetermined number of separate essentially equal and similar compressional waves, the moment of injection of each separate wave of said first set occurring at a fixed time base;
 (b) detecting with said receiving system a first set of seismic waves produced by the first set of compressional waves;
 (c) recording the detected first set of seismic waves to provide a first set of recorded signals having a fixed time base;
 (d) separately injecting into the ground from said source a second set of a second predetermined number of compressional waves essentially equal and similar with respect to each other and the compressional waves of the first set, the moment of injection of each separate wave of said second set occurring at a fixed time base;
 (e) detecting with said receiving system a second set of seismic waves produced by the second set of compressional waves;
 (f) recording the detected second set of seismic waves to provide a second set of recorded signals having a fixed time base; and (g) adding the recorded signals, with the fixed time base of the second set of recorded signals being delayed with respect to the fixed time base of the first set of recorded signals by a predetermined amount.

2. A method for approximating in the field electrical filtering of seismic signals comprising the method of claim 1, each of said sets being representative of a half cycle of the impulse response curve for the electrical filter which it is desired to approximate and the number of essentially equal and similar signals in each said set being in proportion to the area under the respective half cycle, the signals corresponding to negative valves of the area being recorded with reversed polarity.

3. The method of claim 1 wherein the moment of injection of each separate wave of the second set occurs at a fixed time base delayed by said predetermined amount with respect to the fixed time base of the moment of injection of the first set of compressional waves.

4. A method of space-time filtering seismic signals utilizing a seismic system designed for subsurface exploration including an impulsive energy source coupled to the ground for injecting compressional wave energy into the ground in repeatable, essentially equal amounts having means for delaying at will the moment of injection of said energy with respect to a fixed time origin by a desired amount, a ground-coupled receiving system for receiving the seismic waves produced by said source after the waves have undergone reflection by beds in the subsurface including a plurality of receiving stations spaced at a substantially constant interval $\Delta X$ on the ground, and a multichannel recording system for recording signals representative of said seismic waves, comprising:

(a) separately injecting into the ground from said source a first set of a first predetermined number of separate essentially equal and similar compressional waves, the moment of injection of each separate wave of said first set occurring at a fixed time base;

(b) detecting with said receiving system a first set of seismic waves produced by the first set of compressional waves;

(c) recording the detected first set of seismic waves to provide a first set of recorded signals having said fixed time base;

(d) separately injecting into the ground from said source a second set of a second predetermined number of compressional waves essentially equal and similar with respect to each other and the compressional waves of said first set the moment of injection of each separate wave of said second set being delayed in time a known amount $\Delta T$ with respect to said fixed time base;

(e) detecting with said receiving system a second set of seismic waves produced by the second set of compressional waves;

(f) recording the detected second set of seismic waves to provide a second set of recorded signals having a time base delayed a known amount $\Delta T$ with respect to said fixed time base; and (g) adding the recorded signals to produce a summed recording in which events in said recording having an apparent velocity of at least $\Delta X/\Delta T$ are reproduced with minimum distortion and events having an apparent velocity of less than $\Delta X/\Delta T$ are attenuated.

5. The method of claim 4 wherein the signal recordings for each station are added to approximate an electrical filter, the number of signal recordings for each said set being proportional to the amplitude of the impulse response curve for the respective electrical filter which it is desired to approximate at the respective station at time intervals of $\Delta t$.

6. The method of claim 4 wherein there are at least three sets of signal recordings and the recording of each set of signals is delayed with respect to the previously recorded set the time $\Delta t$.

References Cited

UNITED STATES PATENTS

| | | | |
|---|---|---|---|
| 3,326,320 | 6/1967 | Forester | 340—15.5 XR |
| 2,916,724 | 12/1959 | Peterson | 340—15.5 |
| 3,045,207 | 7/1962 | Peterson | 340—15.5 |
| 3,182,743 | 5/1965 | McCollum | 340—15.5 |
| 3,274,541 | 9/1966 | Embree | 340—15.5 |
| 3,274,542 | 9/1966 | Ruehle | 340—15.5 |
| 2,767,389 | 10/1956 | McCollum | 340—15.5 |
| 2,902,107 | 9/1959 | Earth et al. | 181—.5 |
| 3,274,544 | 9/1966 | McCollum | 181—.5 |

RODNEY D. BENNETT, *Primary Examiner.*

BENJAMIN A. BORCHELT, *Examiner.*

R. M. SKOLNIK, C. E. WANDS, *Assistant Examiners.*